UNITED STATES PATENT OFFICE.

EMANUEL WEISS, OF BASLE, SWITZERLAND, ASSIGNOR TO FREDERICK BUXTORF, OF BROOKLYN, NEW YORK.

IMPROVEMENT IN ANTI-INCRUSTATION COMPOUNDS.

Specification forming part of Letters Patent No. 170,137, dated November 16, 1875; application filed January 5, 1874.

*To all whom it may concern:*

Be it known that I, EMANUEL WEISS, of the city of Basle, Switzerland, have invented a new and useful Composition for Removing and Preventing Incrustation in Steam-Boilers, of which the following is a specification:

My composition consists of caustic-soda lye and solution of catechu mixed in the proportions of from ninety to ninety-five per cent. of the caustic lye and from ten to five per cent. of the catechu solution, according to whether it is to be used as a preventive or to dissolve incrustation already existing, a greater strength of alkali being required in the latter case.

In carrying out my invention I prepare a caustic lye of soda of a strength indicated by 36° Baumé, and a strong solution of catechu.

If the composition is to be used in old boilers in which incrustation is already formed, I mix the two solutions in the proportions of ninety-five per cent. of the alkaline solution and five per cent. of the catechu solution. If it is to be used in clean boilers, to prevent the formation of incrustation, the solutions are mixed in the proportions of about ninety per cent. of the lye to ten per cent. of the catechu.

I am aware that alkaline and tanning solutions have before been used to prevent or remedy incrustation; but from many years experimenting I have discovered that the caustic-soda lye produces a better effect than other alkaline solutions, and that the combination therewith of catechu is necessary to its efficient action, and that the catechu has a further and highly-beneficial effect in producing a viscid coating on the interior surface of the boiler, so as to arrest the oxidation which is commonly produced purposely by boiler-makers by the application of uric acid, or by other means, in order to more tightly close the rivet-joints.

My composition does not require the temperature of boiling water in order to combine with the salts of lime, as do many others. It is therefore effectual when introduced in the boiler-feeder. It is effectual in the presence of silicious earth, which many other remedies are not. It acts upon and saponifies the lubricating-oil, which is often conveyed from the condenser to the feeder, and, if allowed to remain on the surface of the water in the boiler, seriously interferes with the evolution of steam.

My compound is not only a preventive of incrustation, but operates with great activity in rapidly dissolving even the thickest incrustations already formed, whether they consist of carbonate of lime, sulphate of lime, carbonate of magnesia, carbonate of iron, alkaline soap, clay, slate, or organic substances. It effectually prevents the deposition of incrustations formed of any of these substances. It neutralizes all organic and inorganic acids. These acids are very liable to get into the feeders of boilers attached to manufacturing establishments—such, for example, as chemical works, paper-mills, and bleacheries. It is not explosive or dangerous in any respect. It does not become volatile at steam heat, and hence does not affect colors. It is not fermentable, is not affected by heat or cold, and is as effective in cold water as hot, so that it will precipitate in the reservoir all substances liable to form incrustation.

I am aware that caustic alkali and various forms of tannic acid have before been used to remove and prevent boiler incrustations, and that these ingredients are combined in compounds heretofore patented, in a number of instances, but in proportions radically different from my composition. I therefore do not claim the ingredients named, except when combined in about the proportions stated, which I have found to materially affect the result.

I claim as new—

The composition herein described, consisting of nine-tenths caustic-soda lye and one-tenth solution of catechu.

In testimony of which invention I hereunto set my hand this 15th day of October, 1873.

EMANUEL WEISS.

Witnesses:
F. BUXTORF-CHRIST,
THEODOR RAILLARD.